(12) United States Patent
Fish et al.

(10) Patent No.: US 9,696,810 B2
(45) Date of Patent: Jul. 4, 2017

(54) MANAGING INK CONTENT IN STRUCTURED FORMATS

(71) Applicant: Microsoft Corporation, Redmond, WA (US)

(72) Inventors: Nathan J. Fish, Seattle, WA (US); Gary L. Caldwell, Redmond, WA (US); Oren Trutner, Kirkland, WA (US); Michael N. Low, Henderson, NV (US); Sarah M. Faulkner, Seattle, WA (US)

(73) Assignee: Microsoft Technology Licensing, LLC, Redmond, CA (US)

( * ) Notice: Subject to any disclaimer, the term of this patent is extended or adjusted under 35 U.S.C. 154(b) by 225 days.

(21) Appl. No.: 13/914,917

(22) Filed: Jun. 11, 2013

(65) Prior Publication Data

US 2014/0365978 A1    Dec. 11, 2014

(51) Int. Cl.
| | |
|---|---|
| *G06F 3/048* | (2013.01) |
| *G06F 3/01* | (2006.01) |
| *G06F 17/24* | (2006.01) |
| *G06K 9/00* | (2006.01) |
| *G06F 3/0488* | (2013.01) |

(52) U.S. Cl.
CPC .......... *G06F 3/017* (2013.01); *G06F 3/04883* (2013.01); *G06F 17/242* (2013.01); *G06F 17/246* (2013.01); *G06K 9/00402* (2013.01); *G06K 9/00449* (2013.01)

(58) Field of Classification Search
CPC .. G06Q 30/0601; G06Q 10/02; G06Q 20/401; G06Q 50/12; G06Q 10/10; G06Q 20/32; G06Q 30/02; G06Q 50/22; G06Q 10/06; G06Q 10/087; G06Q 10/107; G06Q 20/3255; G06Q 30/0283; G06Q 10/063; G06Q 20/01
See application file for complete search history.

(56) References Cited

U.S. PATENT DOCUMENTS

| | | | |
|---|---|---|---|
| 6,108,444 A * | 8/2000 | Syeda-Mahmood | ......... 382/186 |
| 6,952,803 B1 | 10/2005 | Bloomberg et al. | |
| 7,039,234 B2 | 5/2006 | Geidl et al. | |
| 7,409,089 B2 | 8/2008 | Simmons et al. | |
| 7,925,987 B2 | 4/2011 | Gounares | |
| 7,961,943 B1 | 6/2011 | Zeevi | |
| 8,166,388 B2 | 4/2012 | Gounares et al. | |
| 8,315,482 B2 * | 11/2012 | Hou | ...................... G06F 17/242 |
| | | | 382/101 |

(Continued)

OTHER PUBLICATIONS

Microsoft, "Ink Serialization Sample", Published on: Oct. 10, 2011, Available at: http://msdn.microsoft.com/en-us/library/windows/desktop/ms698127(v=vs.85).aspx, 8 pages.

(Continued)

*Primary Examiner* — Di Xiao

(57) ABSTRACT

Managing ink content in structured formats on a computing device is provided. Ink content may be received by the computing device. The ink content may then be recognized by the computing device to correspond to a content format associated with one or more applications. The ink content may then be converted by the computing device into a content associated with the one more applications.

20 Claims, 15 Drawing Sheets

(56) References Cited

U.S. PATENT DOCUMENTS

| | | | |
|---|---|---|---|
| 8,606,011 B1* | 12/2013 | Ivanchenko | G06K 9/3258 382/176 |
| 2004/0196313 A1* | 10/2004 | Wynn et al. | 345/779 |
| 2004/0268237 A1* | 12/2004 | Jones | G06F 17/218 715/205 |
| 2007/0296997 A1* | 12/2007 | Taneda | 358/1.14 |
| 2008/0170789 A1 | 7/2008 | Thacker | |
| 2010/0171754 A1 | 7/2010 | Hatfield et al. | |
| 2012/0173963 A1* | 7/2012 | Hoke | G06F 17/30905 715/234 |
| 2013/0086532 A1* | 4/2013 | Shakespeare | G06F 3/04883 715/863 |
| 2013/0305146 A1* | 11/2013 | Hashiba | G06F 17/30011 715/255 |
| 2014/0172996 A1* | 6/2014 | Deeter | H04L 51/24 709/206 |

OTHER PUBLICATIONS

"International Search Report & Written Opinion for PCT Patent Application No. PCT/US2014/040144", Mailed Date: Sep. 8, 2014, 11 Pages.

\* cited by examiner

| | A | B | C | D | E | F |
|---|---|---|---|---|---|---|
| 1 | STATE | PEOPLE | | | | |
| 2 | WA | 94 | | | | |
| 3 | CA | 21 | | | | |
| 4 | | 115 | | | | |
| 5 | | | | | | |

Cell reference: B4, Formula: =SUM(B2:B3) — *1010*

MANAGING INK CONTENT IN STRUCTURED FORMATS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Computer software applications, such as virtual meeting, collaboration and instant messaging applications may be utilized to enter free form content (e.g., handwriting or hand-drawn images) using virtual "ink" on a computing device display. These applications may also enable users to save virtual ink in its original free form content. However, there are several drawbacks associated with current applications when the need arises for free form content to be saved as structured content so that it may be utilized in one or more productivity applications (e.g., word processing applications, spreadsheet applications, presentation applications, etc.). For example, utilizing current software applications, handwritten free from content must be either manually reproduced (e.g., retyped from displayed ink) or alternatively, users are required to enter into special input modes (e.g., "ink-to-text") modes to convert free form content into structured content. Current software applications however, are unable to receive free form content (i.e., unstructured ink) and turn it into a structured format so that it can be natively recognized and manipulated. It is with respect to these considerations and others that the various embodiments of the present invention have been made.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are provided for managing ink content in structured formats on a computing device. The ink content may then be recognized by the computing device to correspond to a content format associated with one or more applications. The ink content may then be converted by the computing device into a content associated with the one more applications.

These and other features and advantages will be apparent from a reading of the following detailed description and a review of the associated drawings. It is to be understood that both the foregoing general description and the following detailed description are illustrative only and are not restrictive of the invention as claimed.

BRIEF DESCRIPTION OF THE DRAWINGS

FIG. 8 is a diagram illustrating a user interface for managing ink content in structured formats on a computing device, in accordance with an embodiment;

FIG. 9 is a diagram illustrating a user interface for managing ink content in structured formats on a computing device, in accordance with an embodiment;

FIG. 10 is a diagram illustrating a user interface for managing ink content in structured formats on a computing device, in accordance with an embodiment;

DETAILED DESCRIPTION

Embodiments are provided for managing ink content in structured formats on a computing device. The ink content may then be recognized by the computing device to correspond to a content format associated with one or more applications. The ink content may then be converted by the computing device into a content associated with the one more applications.

In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents.

Figure 1:
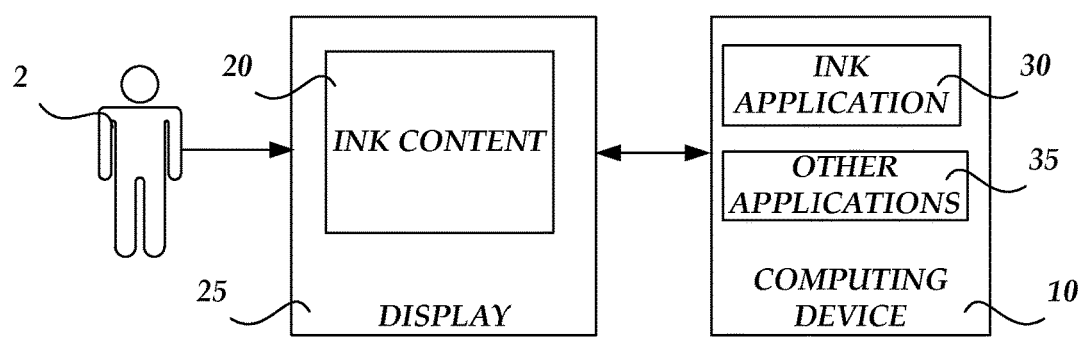
FIG. 1 is a block diagram illustrating a system architecture for managing ink content in structured formats, in accordance with various embodiments.

Referring now to the drawings, in which like numerals represent like elements through the several figures, various aspects of the present invention will be described. FIG. 1 is a block diagram illustrating a system architecture for managing ink content in structured formats, in accordance with various embodiments. The system architecture includes a display 25 which is in communication with a user 2 and a computing device 10. It should be appreciated that multiple users may be in communication with the display 25, either simultaneously or individually, in accordance with various embodiments. In accordance with an embodiment, the display 25 may be an interactive display which, in combination with the computing device 10, comprises an interactive whiteboard. As is known to those skilled in the art, interactive whiteboards may include a projector (not shown) which projects the output of a computer onto the surface of an interactive display which may be mounted to a wall or stand. Users may control the computer via pen, touch, stylus or other input device or method to perform a number of functions including running software that is loaded onto the connected computer and capturing and saving written notes which may appear as ink on the interactive display. It should be understood however, the embodiments described herein are not limited to interactive whiteboards and that other computing devices having interactive displays may also be utilized including, but not limited to, slate or tablet computing devices, smartphones, laptop computers, touch screen displays in communication with a desktop or laptop computer, and "all-in-one" touch screen computing devices.

The display 25 may show ink content 20 which may include, without limitation, text, shapes, tables and lists received from the user 2 utilizing one of the aforementioned input methods described above. The computing device 10 comprises an ink application 30 and other applications 35. As will be described in greater detail below with respect to FIGS. 2-16, the ink application 30 may be configured to recognize the ink content 20 received from the user 2 as one or more structured formats and convert the ink content 20 into a content format (e.g., a word processing format, a spreadsheet format, a drawing format, etc.) associated with one or more of the other applications 35. In accordance with an embodiment, the ink application 30 may comprise a program module within productivity application software, including, but not limited to, word processing software, presentation graphics software, spread sheet software, diagramming software, project management software, publishing software, personal information management software and collaboration software. The other applications 35 may also include one or more of the aforementioned productivity application software. It should be appreciated that, in accordance with an embodiment, the ink application 30 may be incorporated into one or more of the following software applications: the WORD word processing software, POWERPOINT presentation graphics software, EXCEL spreadsheet software, VISIO diagramming software, PROJECT project management software, PUBLISHER publishing software, OUTLOOK personal information management software and the ONENOTE note-taking and collaboration software from MICROSOFT CORPORATION of Redmond Wash. It should be appreciated that the aforementioned software applications may comprise individual application programs or alternatively, may be incorporated into a suite of applications such as the OFFICE application program suite from MICROSOFT CORPORATION. In accordance with other embodiments, the ink application 30 may also be incorporated into one or more communication software applications such as the SKYPE voice-over-Internet Protocol ("VoIP") service and software application and the LYNC client communications platform software from MICROSOFT CORPORATION of Redmond, Wash. It should be understood, however, that the embodiments described herein may also be practiced in conjunction with other application programs and further, is not limited to any particular application or system.

Figure 2:
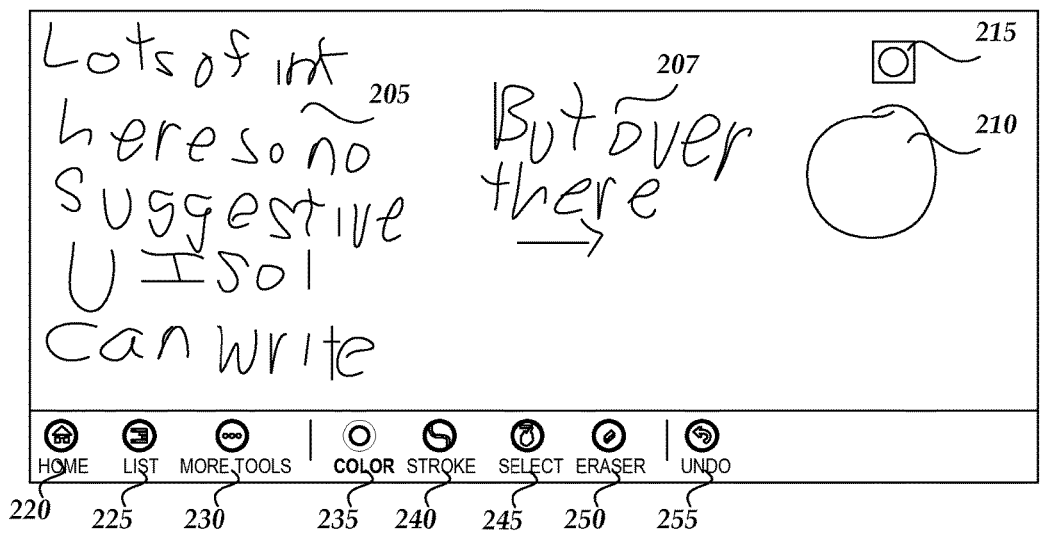
FIG. 2 is a diagram illustrating a user interface for managing ink content in structured formats on a computing device, in accordance with an embodiment.

FIG. 2 is a diagram illustrating a user interface 200 for managing ink content in structured formats on a computing device, in accordance with an embodiment. The user interface 200, which may be generated by the ink application 30 on the display 25, includes user interface controls 220, 225, 230, 235, 240, 245, 250 and 255, for facilitating ink input by the user 2. For example, the user interface control 240 may be utilized to enter ink content 205, 207 and 210 in the user interface 200. The user interface 200 also includes suggestion user control 215 which may be generated by the ink application 30 upon a determination that a particular ink object may comprise a shape. For example, the ink application 30 may determine that the ink content 205 and 207 appears to be text while the ink content 210, which is drawn in a separate area of the user interface 200, appears to be a shape (i.e., a circle). In response, the ink application 30 may generate the suggestion prompt 215 which, when selected by the user 2 (e.g., by tapping with a finger or stylus), requests whether the user 2 would like to convert the ink content 210 from ink to a physical object. If the user 2 agrees, the ink application 30 may replace the ink content 210 with a drawing object (i.e., a circle) which is compatible with a drawing or diagramming software program. On the other hand, if the user 2 ignores the suggestion (i.e., by not selecting the suggestion user control 215), then the ink application 30 may stop shape recognition in the area of the user interface 2 comprising the ink content 210.

Figure 3:
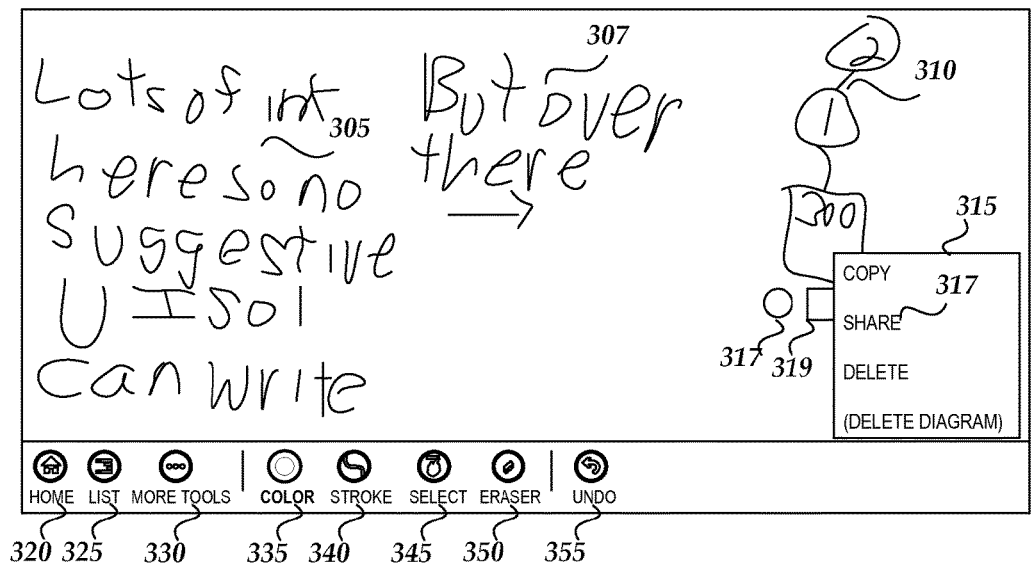
FIG. 3 is a diagram illustrating a user interface for managing ink content in structured formats on a computing device, in accordance with an embodiment.

FIG. 3 is a diagram illustrating a user interface 300 for managing ink content in structured formats on a computing device, in accordance with an embodiment. The user interface 300, which may be generated by the ink application 30 on the display 25, includes user interface controls 320, 325, 330, 335, 340, 345, 350 and 355, for facilitating ink input by the user 2. For example, the user interface control 340 may be utilized to enter ink content 305 and 307 (shown as text) as well as ink content 310 (shown as a group of shapes), in the user interface 300. In accordance with an embodiment, the ink application 30 may be configured to recognize the shapes comprising the ink content 310 and display prompts 317 and 319 which, when selected by the user 2, displays a menu 315 including an export option. In particular, the prompts 317 and 319 may be selected for an export option associated with shapes. In accordance with an embodiment, the export option in the menu 315 may comprise a Share command 317 for exporting shapes into any number of other application programs which may include, for example, drawing or diagramming and presentation graphics software programs.

Figures 4, 5:
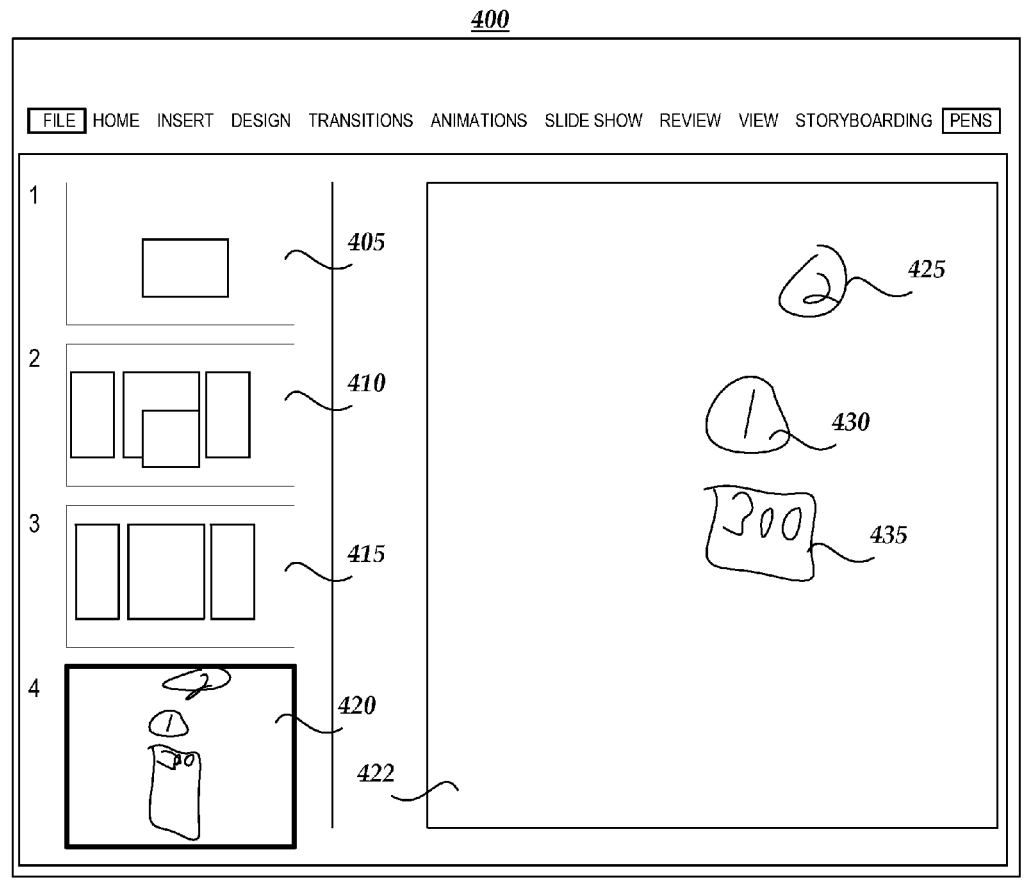
FIG. 4 is a diagram illustrating a user interface for managing ink content in structured formats on a computing device, in accordance with an embodiment.
FIG. 5 is a diagram illustrating a user interface for managing ink content in structured formats on a computing device, in accordance with an embodiment.

FIG. 4 is a diagram illustrating a user interface 400 for managing ink content in structured formats on a computing device, in accordance with an embodiment. The user interface 400, which may be generated by one of the other applications 35 on the display 25, may include presentation slides 405, 410, 415 and 420. As can be seen from FIG. 4, the presentation slide 420 has been selected and thus the slide content 425, 430 and 435 is also shown in window 422. It should be understood that the slide content 425, 430 and 435 may represent shapes exported from the ink application 30 after executing the Share command discussed with respect to FIG. 3, above. For example, the slide content 425, 430 and 435 may correspond to the ink content 310 which was recognized as comprising shapes by the ink application 30 in FIG. 3. In accordance with an embodiment, exported shapes may be represented as graphics or drawing objects in the receiving application.

FIG. 5 is a diagram illustrating a user interface 500 for managing ink content in structured formats on a computing device, in accordance with an embodiment. The user interface 500, which may be generated by the ink application 30 on the display 25, includes ink content 505 (shown as a table) and a user control 510. It should be understood that, in accordance with an embodiment, the horizontal and vertical lines forming the table in the ink content 505 may be drawn by the user 2 (e.g., via touch, stylus or other input means) on the display 25 or, alternatively, the user 2 may select the user control 510 (e.g., via touch, stylus or other input means) which would generate a menu (not shown) from which the user 2 may request a blank table to be rendered on the display 25. In accordance with an embodiment, when the user 2 requests a table, the ink application 30 may be configured to provide a table structure similar to that of a spreadsheet table but optimized in both size and function for ink. For example, the tables generated by the ink application 30 may contain larger cells to facilitate the entry of ink content, row and/or column sizes may be manipulated by touch, and columns may be sorted and reordered.

Figure 6:
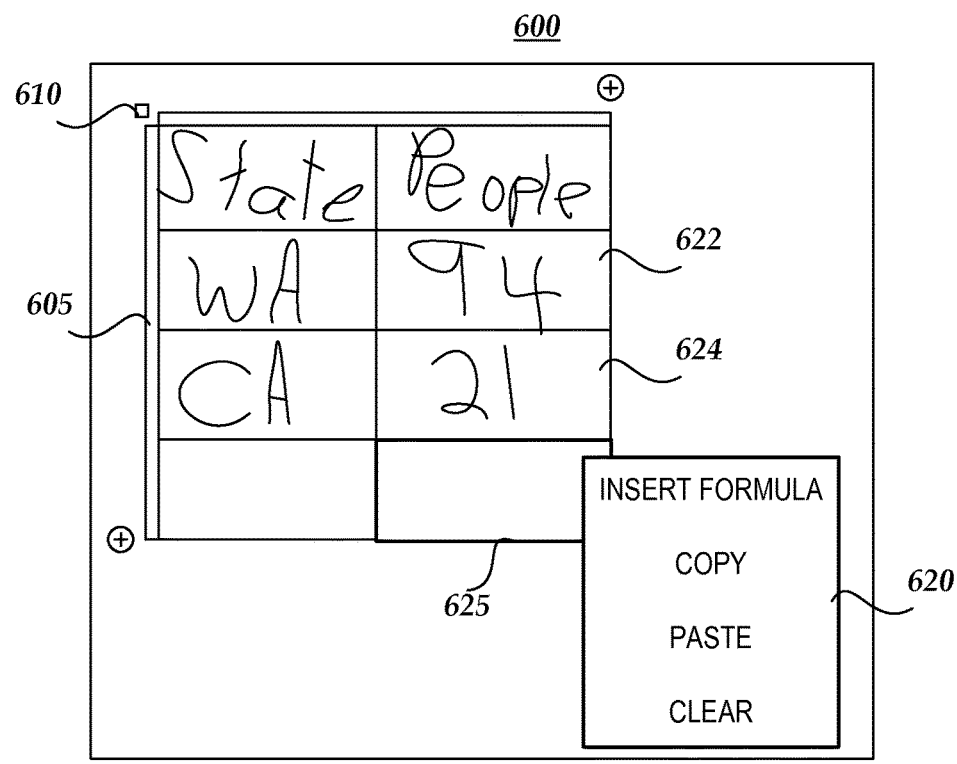
FIG. 6 is a diagram illustrating a user interface for managing ink content in structured formats on a computing device, in accordance with an embodiment.

FIG. 6 is a diagram illustrating a user interface 600 for managing ink content in structured formats on a computing device, in accordance with an embodiment. The user interface 600, which may be generated by the ink application 30 on the display 25, includes ink content 605 (shown as a table) and a user control 610. In accordance with an embodiment, the ink application 30 may be configured to generate a menu 620 from which the user 2 may insert a formula in a selected table cell 625. For example, in response to the user 2 selecting the table cell 625 (e.g., via touch, stylus or other input means), the ink application 30 may generate the menu 620 from which a user may select the Insert Formula option to insert a summation formula into the cell 625 in order to calculate the sum of the recognized numerical ink content in the cells 622 and 624.

Figure 7:
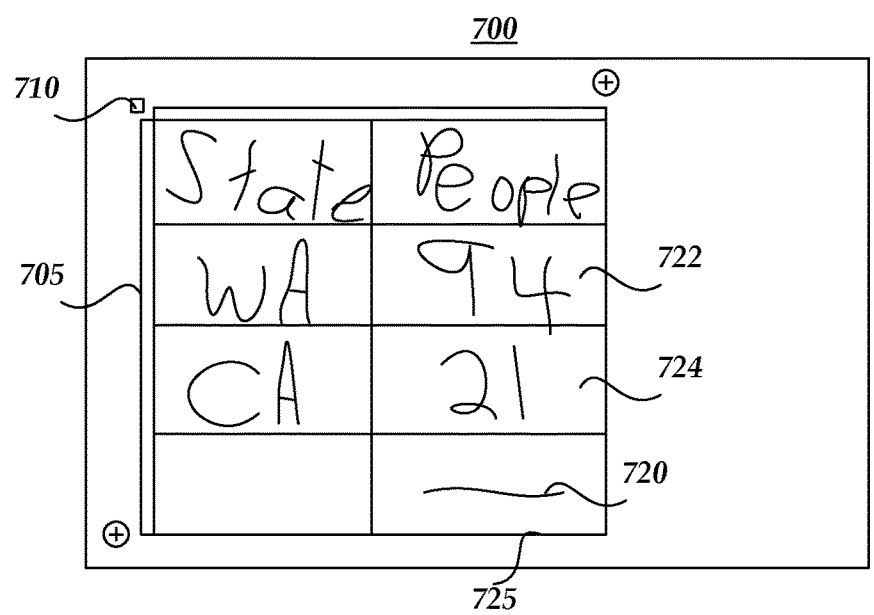
FIG. 7 is a diagram illustrating a user interface for managing ink content in structured formats on a computing device, in accordance with an embodiment.

FIG. 7 is a diagram illustrating a user interface 700 for managing ink content in structured formats on a computing device, in accordance with an embodiment. The user interface 700, which may be generated by the ink application 30 on the display 25, includes ink content 705 (shown as a table) and a user control 710. In accordance with an embodiment, the ink application 30 may be configured to insert a formula in a table cell (e.g., the cell 725) in response to receiving ink gesture 720 from the user 2 (shown as a horizontal line in FIG. 7). Thus, for example, the user 2, via touch, stylus or other input means, may perform a swipe gesture to enter the ink gesture 720 in the cell 725 of the table on the display 25. The ink gesture 720 serves as a means of signaling the ink application 30 that the user 2 wishes to add recognized numerical ink content in cells 722 and 724.

Figures 8, 9:
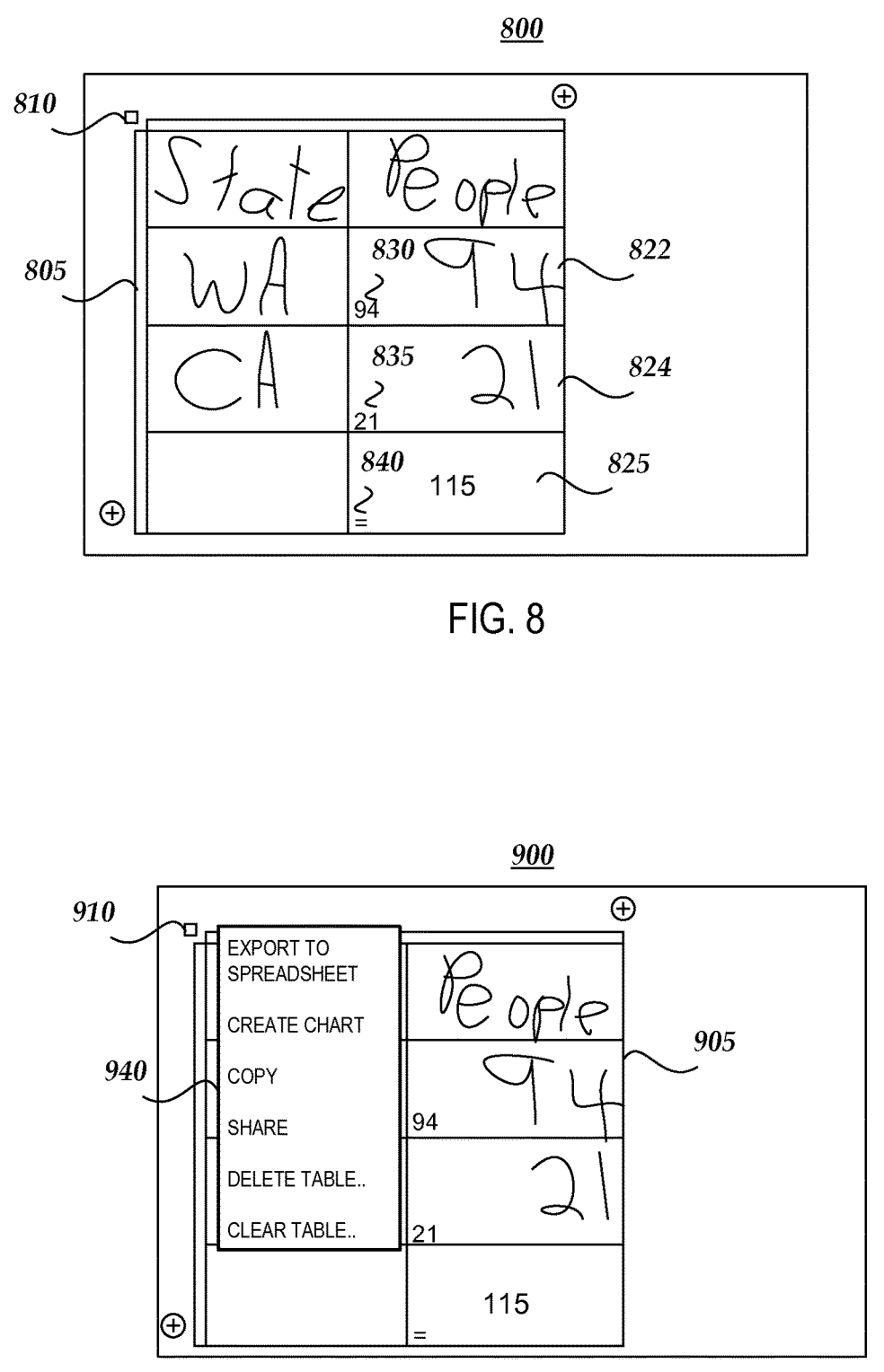

FIG. 8 is a diagram illustrating a user interface 800 for managing ink content in structured formats on a computing device, in accordance with an embodiment. The user interface 800, which may be generated by the ink application 30 on the display 25, includes ink content 805 (shown as a table) and a user control 810. In accordance with an embodiment, and in response to receiving the ink gesture 720 shown in FIG. 7, the ink application 30 may perform a summation operation on the recognized numerical ink content in the cells 822 and 824 and display the result in the cell 825. It should be understood that the cells 822, 824 and 825 may also include indicia (such as watermarks) 830, 835 and 840 following the summation operation. In particular, the indicia 830 and 835 may represent the interpretation (i.e., recognition result) by the of the ink application 30 of the ink entries made by the user 2 in the cells 822 and 824. If the displayed indicia does not correspond to what the user intended to enter into the cell (e.g., the number 94 was incorrectly interpreted as the number 74), then the user 2 may quickly make appropriate corrections.

FIG. 9 is a diagram illustrating a user interface 900 for managing ink content in structured formats on a computing device, in accordance with an embodiment. The user interface 900, which may be generated by the ink application 30 on the display 25, includes content 905 (shown as a table) and a user control 910. In accordance with an embodiment, in response to a selection of the user control 910, the ink application 30 may be configured to display a menu 940 which includes options for exporting the content 905 to one of the other applications 35 (e.g., a spreadsheet software program).

FIG. 10 is a diagram illustrating a user interface 1000 for managing ink content in structured formats on a computing device, in accordance with an embodiment. The user interface 1000, which may be generated by one of the other applications 35 (e.g., a spreadsheet software program) on the display 25, may include a spreadsheet table 1005 and a formula bar 1010. As can be seen from FIG. 10, the spreadsheet table 1005 displays the ink content which was exported from the ink application 30 in response to the selection of one options in the menu 940 discussed above with respect to FIG. 9. It should be understood that the exported ink content may be displayed in the spreadsheet table 1005 in a format associated with the spreadsheet software program instead of ink. The formula bar 1010 displays the formula which was also exported from the ink application 30.

Figure 11:
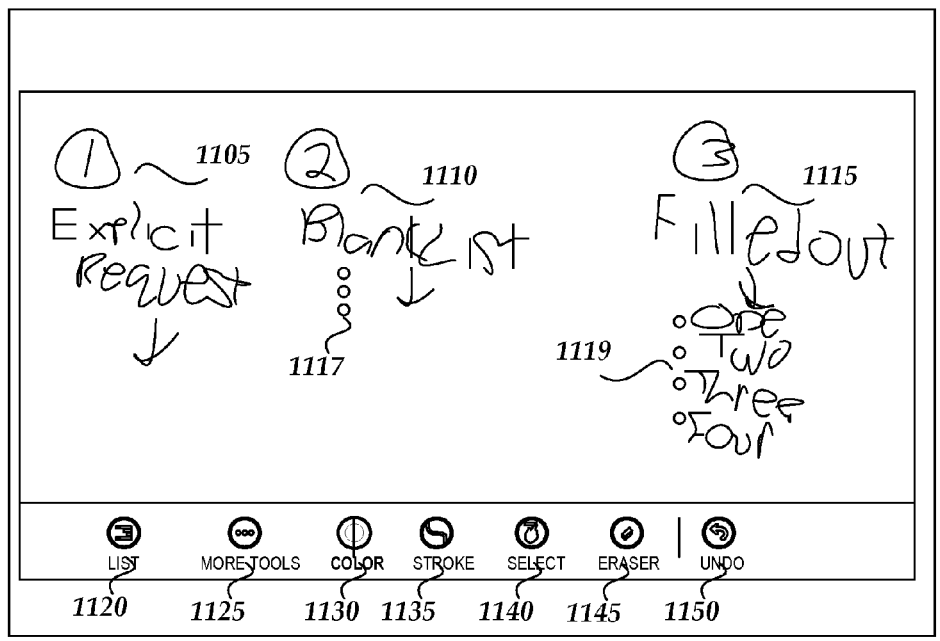
FIG. 11 is a diagram illustrating a user interface for managing ink content in structured formats on a computing device, in accordance with an embodiment.

FIG. 11 is a diagram illustrating a user interface 1100 for managing ink content in structured formats on a computing device, in accordance with an embodiment. The user interface 1100, which may be generated by the ink application 30 on the display 25, includes user interface controls 1120, 1125, 1130, 1135, 1140, 1145 and 1150, for facilitating ink input by the user 2. For example, the user interface control 1135 may be utilized to enter ink content 1105, 1110 and 1115 and the user interface control 1120 may be utilized to generate blank list (shown below ink content 1110) in which a user 2 may enter ink content to create a list (e.g., ink content 1115). It should be understood that in accordance with other embodiments (described below), the ink application 30 may also generate a list by converting previously entered ink content made by the user 2 on the display 25.

Figure 12:
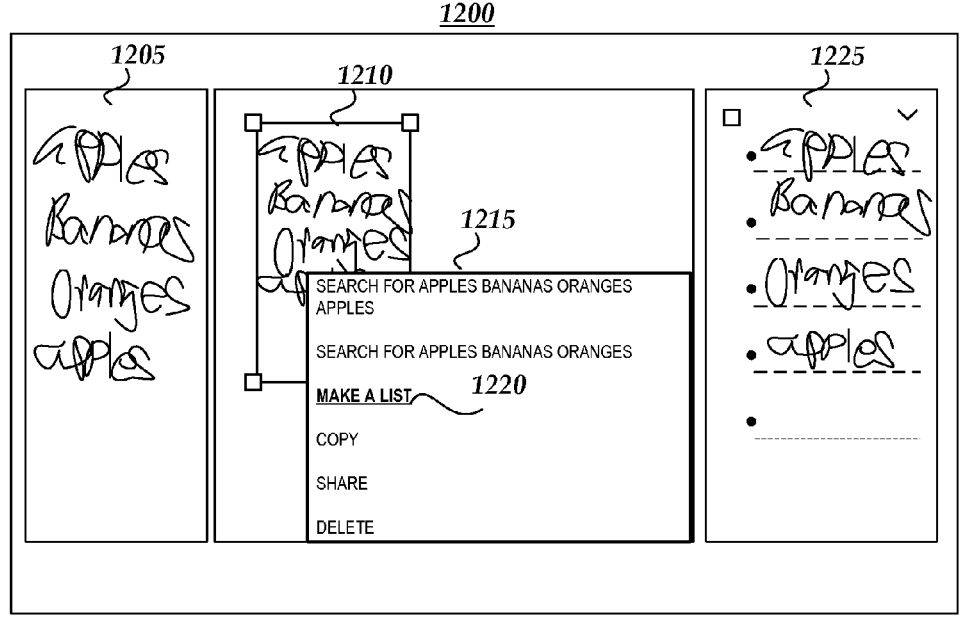
FIG. 12 is a diagram illustrating a user interface for managing ink content in structured formats on a computing device, in accordance with an embodiment.

FIG. 12 is a diagram illustrating a user interface 1200 for managing ink content in structured formats on a computing device, in accordance with an embodiment. The user interface 1200, which may be generated by the ink application 30 on the display 25, includes ink content 1205. As briefly described above with respect to FIG. 11, the ink application 30 may be configured to display a menu 1215 in response to a selection of the ink content 1205 (shown as selected ink content 1210) via touch, stylus or other input means by the user 2. For example, the user 2 may select the ink content 1205 by using a finger to draw a rectangle around the ink content so that it may be highlighted or otherwise distinguished. The menu 1215 may include a list option 1220 which, when selected by the user 2, may cause the ink application 30 to display the ink content 1205 as a list 1225. It should be understood that, in accordance with an embodiment, the ink content 1205 in the list 1225 may be converted to text and terms in the list 1225 (i.e., apples, bananas, oranges, apples) may be searched utilizing a searching function in the menu 1215.

Figure 13:
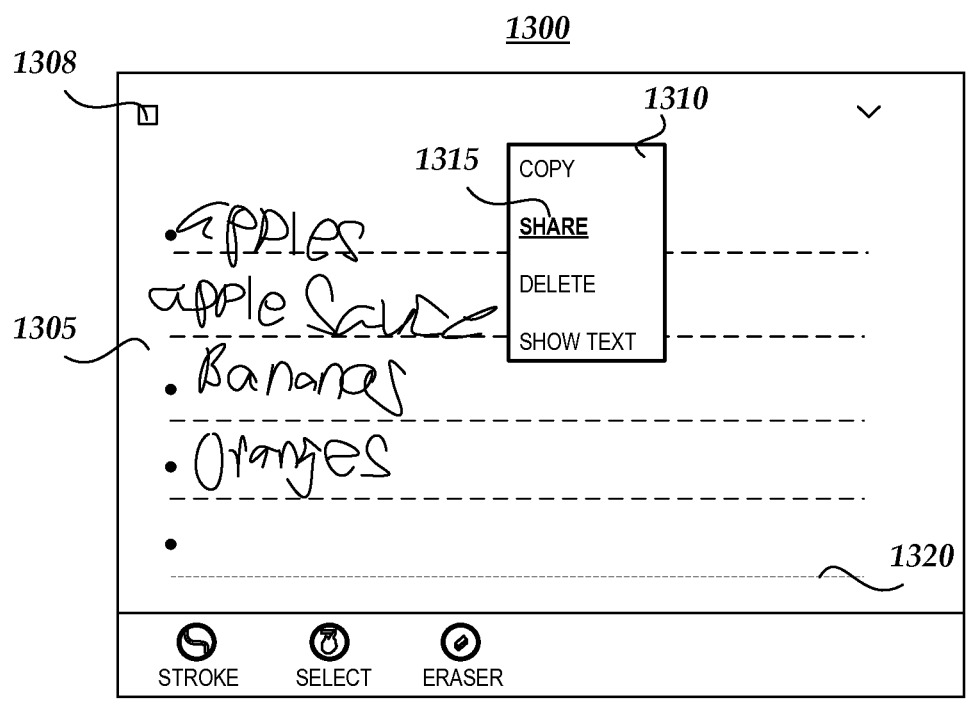
FIG. 13 is a diagram illustrating a user interface for managing ink content in structured formats on a computing device, in accordance with an embodiment.

FIG. 13 is a diagram illustrating a user interface 1300 for managing ink content in structured formats on a computing device, in accordance with an embodiment. The user interface 1300, which may be generated by the ink application 30 on the display 25, includes a list of ink content 1305. As discussed above with respect to FIG. 12, the ink application 30 may generate a list of ink content from user ink content entered on the display 25. It should be appreciated that the ink application 30 may also be configured to allow the list 1305 to be expanded or contracted in response to edits made by the user. For example, the ink application 30 may automatically expand the list 1305 in response to receiving the ink content "apple sauce." The ink application 30 may also enable additional items to the list 1305 by including a "ghost" entry line 1320 below the last item in the list. Thus, a user 2 desiring to add additional ink content to the list 1305 may utilize the ghost entry line 1320 for that purpose. The user interface 1300 may also include a user control 1308 which, when selected by user 2, displays a menu 1310 including an export option. In accordance with an embodiment, the export option in the menu 1310 may comprise a Share command 1315 for sharing the list 1305 with others as will be described in greater detail below with respect to FIG. 14.

Figure 14:
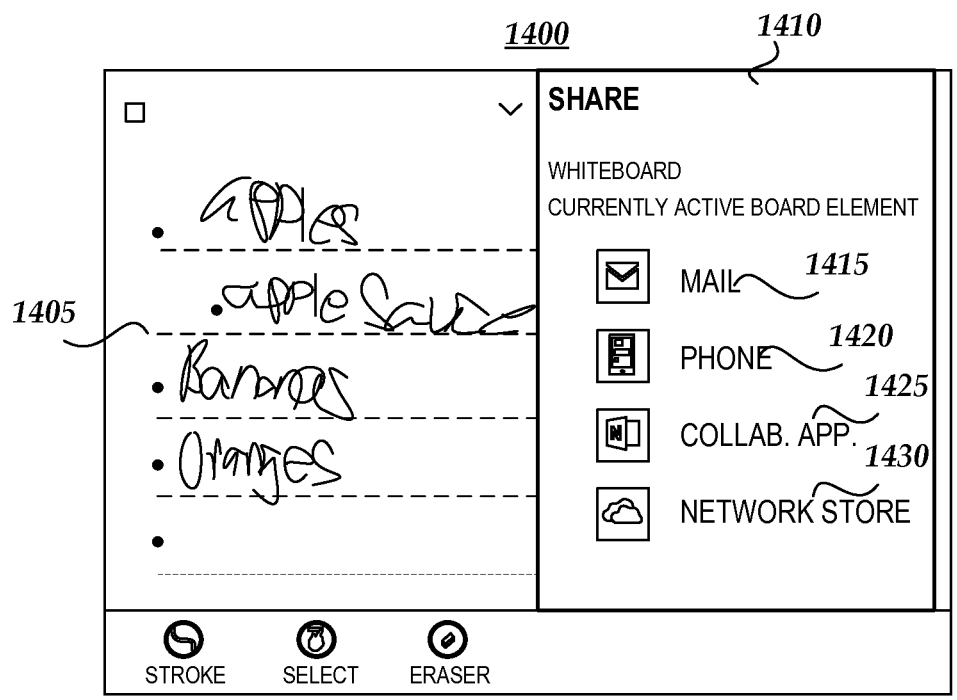
FIG. 14 is a diagram illustrating a user interface for managing ink content in structured formats on a computing device, in accordance with an embodiment.

FIG. 14 is a diagram illustrating a user interface 1400 for managing ink content in structured formats on a computing device, in accordance with an embodiment. The user interface 1400, which may be generated by the ink application 30 on the display 25, includes a list of ink content 1405 and an export pane 1410 for sharing the list 1405 with others. The export pane 1410 may be generated in response to a selection of the Share command 1315 from the menu 1310 of FIG. 13 (discussed above). In accordance with an embodiment, the export pane 1410 may include a mail application option 1415, a communications application option 1420, a collaboration application option 1425 and a network store option 1430 which may be selected by a user 2 for sharing the list 1405 with others. In accordance with an embodiment, the network store 1430 may comprise a file hosting service such as the ONEDRIVE file hosting service provided by MICROSOFT CORPORATION of Redmond, Wash. Other file hosting services may also be utilized.

Figure 15:
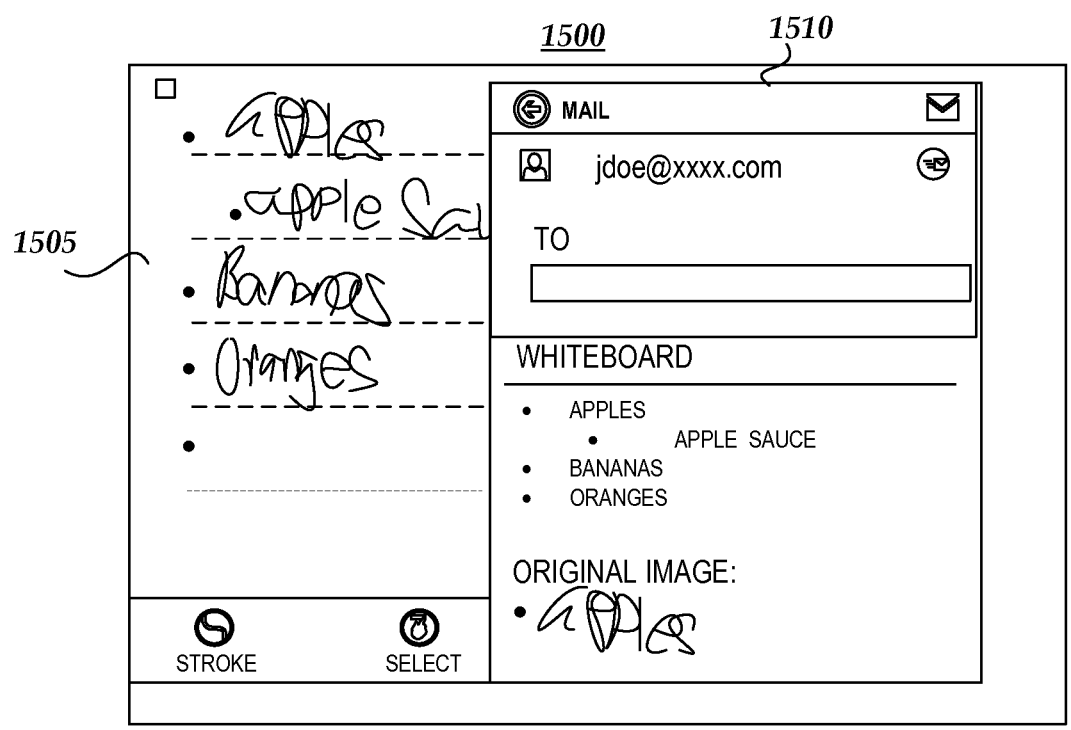
FIG. 15 is a diagram illustrating a user interface for managing ink content in structured formats on a computing device, in accordance with an embodiment.

FIG. 15 is a diagram illustrating a user interface 1500 for managing ink content in structured formats on a computing device, in accordance with an embodiment. The user interface 1500, which may be generated by the ink application 30 on the display 25, includes a list of ink content 1505 and a Mail pane 1510 for sharing the list 1505 with others via an electronic mail message.

Figure 16:
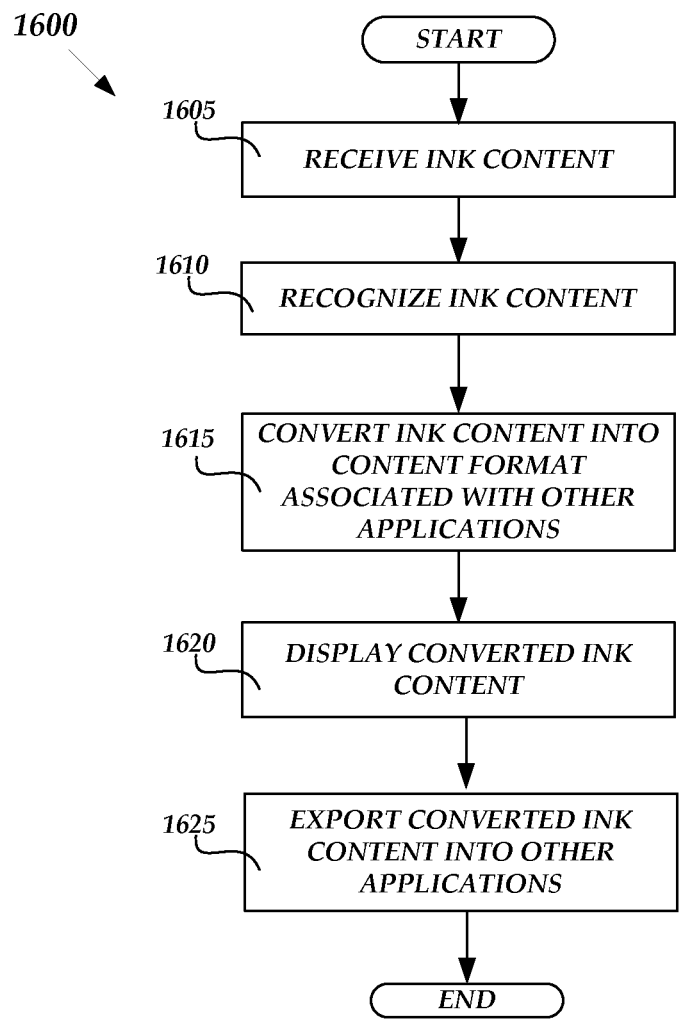
FIG. 16 is a flow diagram illustrating a routine for managing ink content in structured formats on a computing device, in accordance with an embodiment.

FIG. 16 is a flow diagram illustrating a routine 1600 for managing ink content in structured formats on a computing device, in accordance with an embodiment. When reading the discussion of the routines presented herein, it should be appreciated that the logical operations of various embodiments of the present invention are implemented (1) as a sequence of computer implemented acts or program modules running on a computing system and/or (2) as interconnected machine logical circuits or circuit modules within the computing system. The implementation is a matter of choice dependent on the performance requirements of the computing system implementing the invention. Accordingly, the logical operations illustrated in FIG. 16 and making up the various embodiments described herein are referred to variously as operations, structural devices, acts or modules. It will be recognized by one skilled in the art that these operations, structural devices, acts and modules may be implemented in software, in hardware, in firmware, in special purpose digital logic, and any combination thereof without deviating from the spirit and scope of the present invention as recited within the claims set forth herein.

The routine 1600 begins at operation 1605, where the ink application 30, executing on the computing device 10, may receive the ink content 20 from the user 2 via the display 25. As discussed above with respect to FIGS. 2-15, the ink content 20 may include, without limitation, text, shapes, tables and lists. In accordance with an embodiment, the ink content 20 may be received in response to a request to enter ink content corresponding to a predetermined content format. For example and as discussed above with respect to FIG. 5, the user 2 may select the user control 510 (e.g., via touch, stylus or other input means) to generate a menu from which the user 2 may request a blank table to be rendered on the display 25. After the table has been rendered, the user 2 may then enter the ink content 20 into the table cells (i.e., columns and rows).

From operation 1605, the routine 1600 continues to operation 1610, where the ink application 30, executing on the computing device 10, may recognize the ink content 20 received at operation 1605. In particular, the ink application 30 may recognize the ink content 20 as being associated with a word processing format (e.g., text), a spreadsheet format (e.g., rows and columns comprising numbers and text) or a drawing format (e.g., shapes).

From operation 1610, the routine 1600 continues to operation 1615, where the ink application 30, executing on the computing device 10, may converting the ink content 20 into a content format associated with the one more applications 35. For example, the ink content 20 may be converted into a word processing format, a spreadsheet format or a drawing format. In accordance with an embodiment, prior to converting the ink content 20, the ink application 30 may generate a prompt requesting whether to convert a portion of the ink content 20 to a suggested content format. For example, and as discussed above with respect to FIG. 2, the generation of the prompt by the ink application 30 may be at least partially based on a determination that a portion of the ink content 20 is located a distance away from other portions of the ink content 20.

From operation 1615, the routine 1600 continues to operation 1620, where the ink application 30, executing on the computing device 10, may display the converted ink content on the display 25. For example, if the ink content 20 comprises a table, the ink application 30 may display the table as a spreadsheet formatted according to a known spreadsheet format.

From operation 1620, the routine 1600 continues to operation 1625, where the ink application 30, executing on the computing device 10, may export the converted ink content into one of the other applications 35. For example, and as discussed above with respect to FIG. 10, the converted ink content may be exported into spreadsheet application software. For example, a spreadsheet application may be launched from the computing device 10 for viewing on the display 25. The converted ink content may then be exported into the spreadsheet application for viewing on the display 25. From operation 1625, the routine 1600 then ends.

Figure 17:
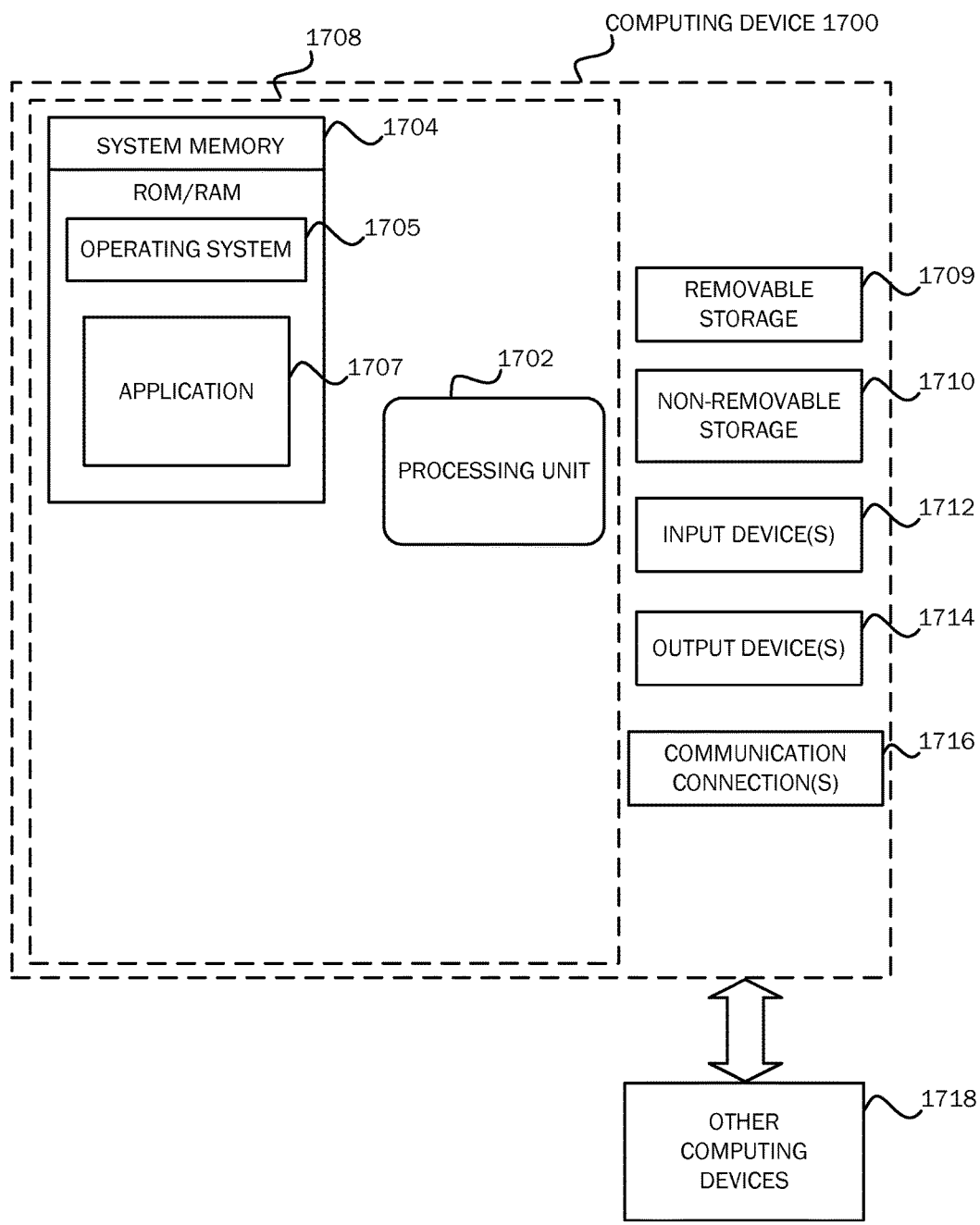
FIG. 17 is a simplified block diagram of a computing device with which various embodiments may be practiced.
Figure 18A:
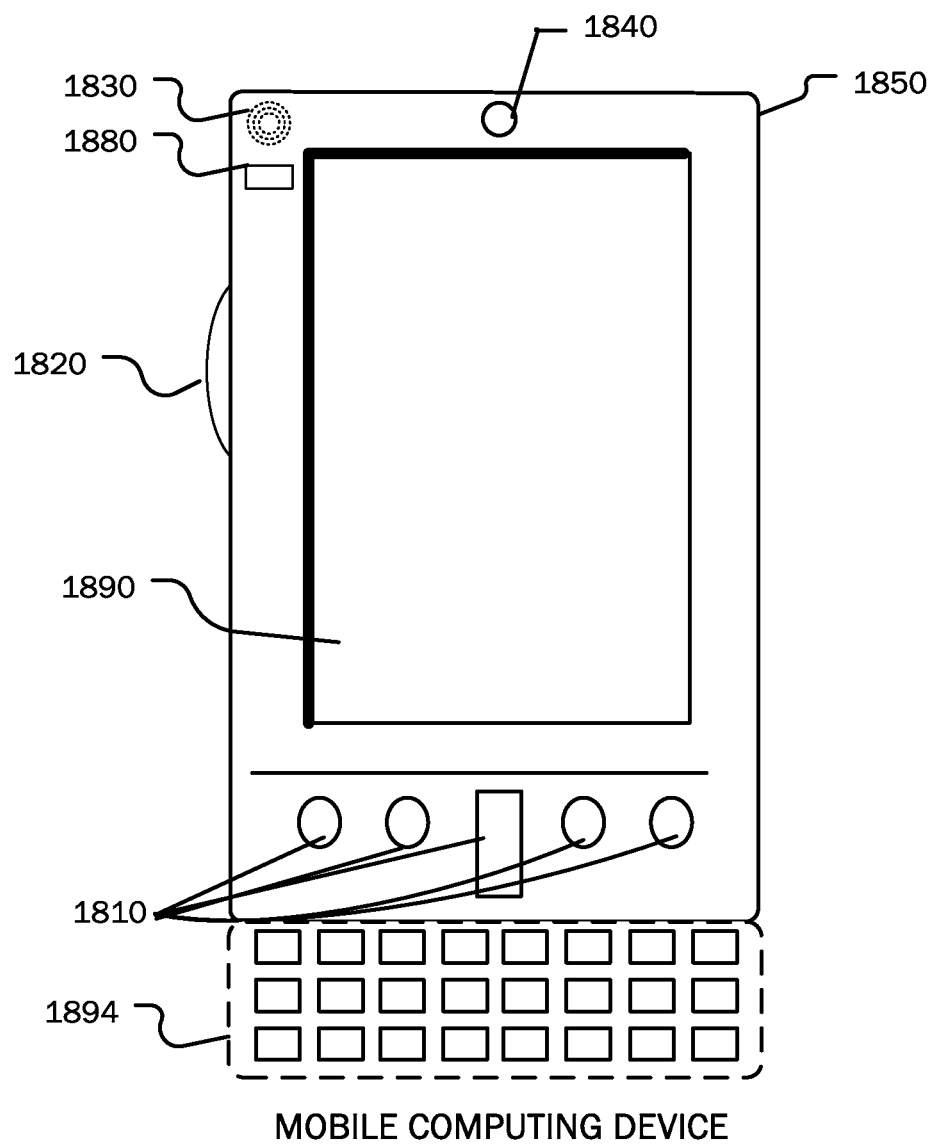
FIG. 18A is a simplified block diagram of a mobile computing device with which various embodiments may be practiced.
Figure 18B:
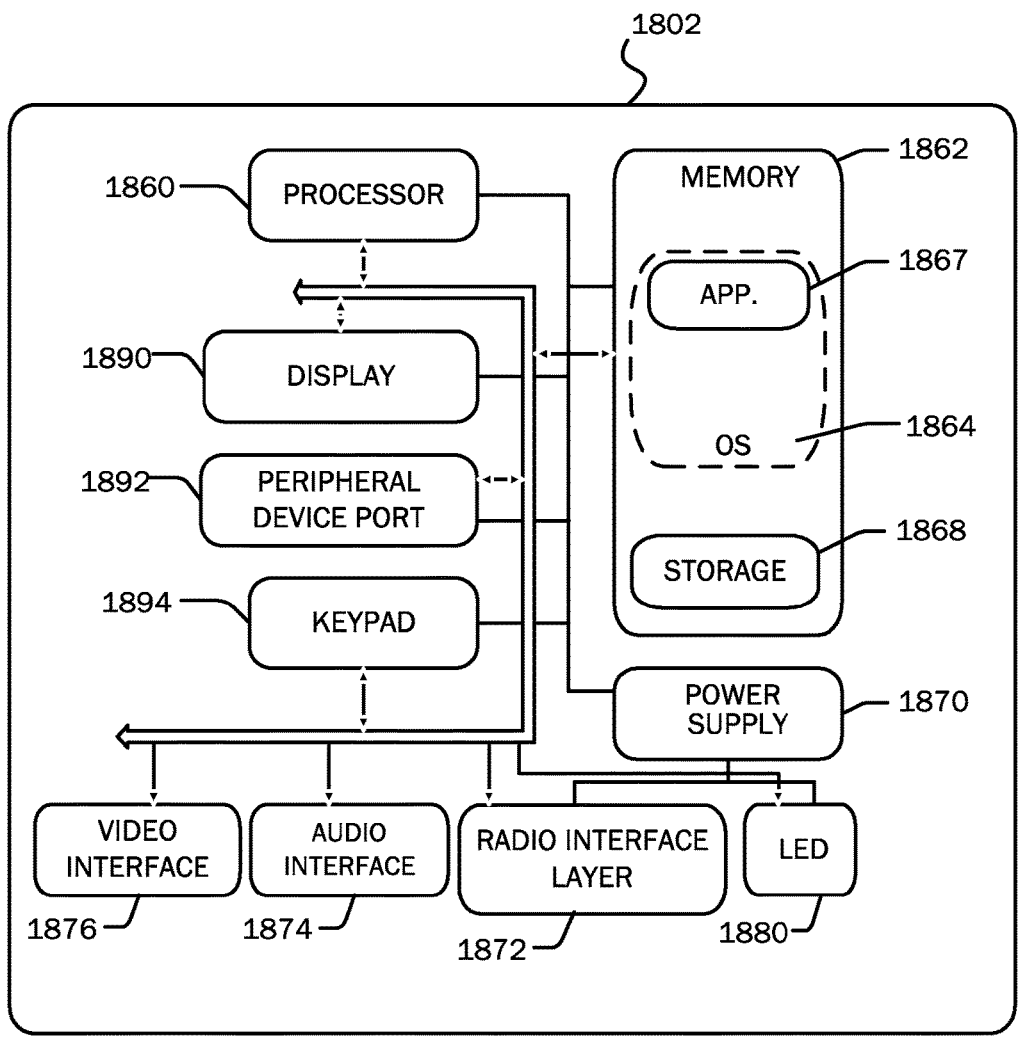
FIG. 18B is a simplified block diagram of a mobile computing device with which various embodiments may be practiced.
Figure 19:
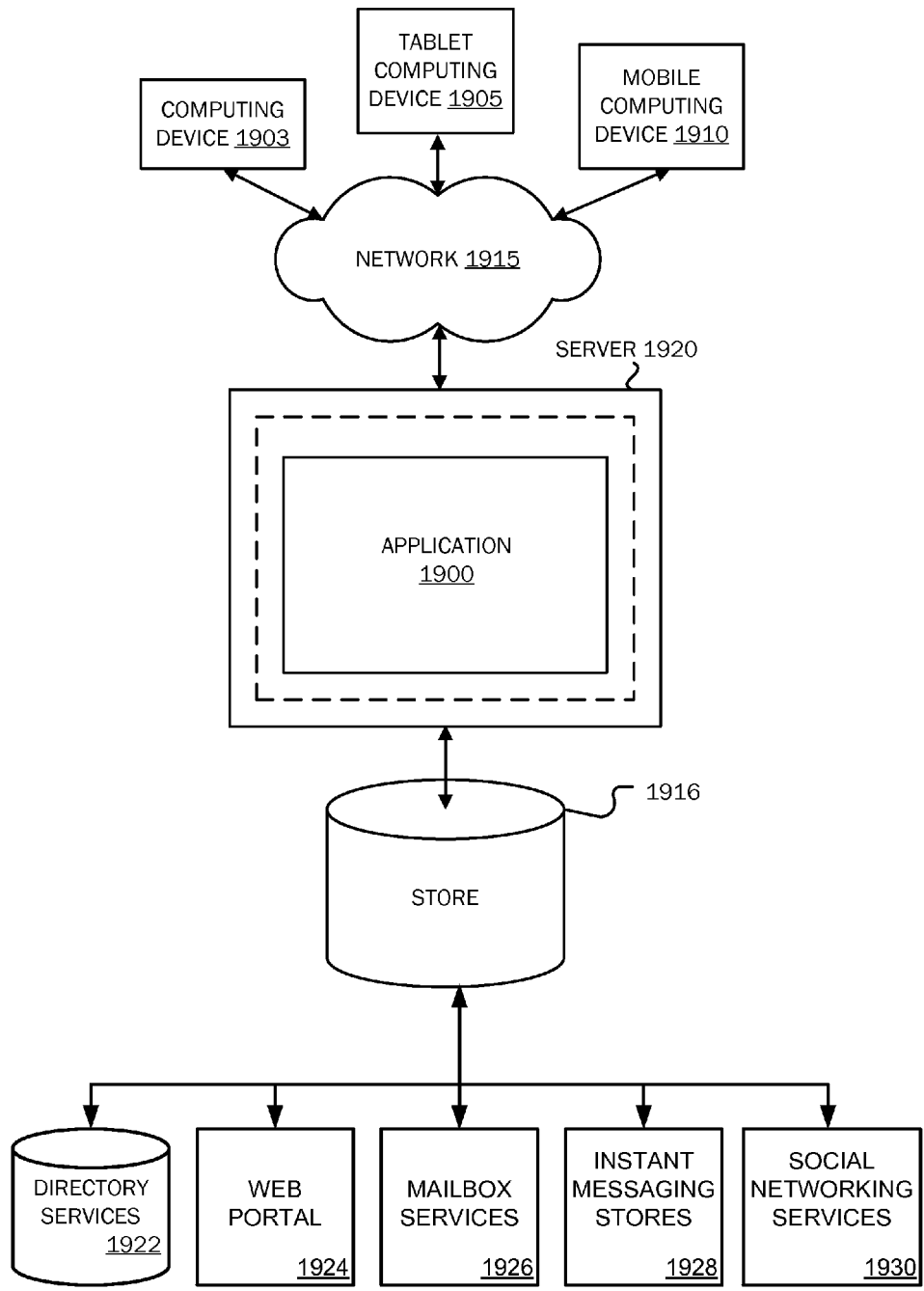
FIG. 19 is a simplified block diagram of a distributed computing system in which various embodiments may be practiced.

FIGS. 17-19 and the associated descriptions provide a discussion of a variety of operating environments in which embodiments of the invention may be practiced. However, the devices and systems illustrated and discussed with respect to FIGS. 17-19 are for purposes of example and illustration and are not limiting of a vast number of computing device configurations that may be utilized for practicing embodiments of the invention, described herein.

FIG. 17 is a block diagram illustrating example physical components of a computing device 1700 with which various embodiments may be practiced. In a basic configuration, the computing device 1700 may include at least one processing unit 1702 and a system memory 1704. Depending on the configuration and type of computing device, system memory 1704 may comprise, but is not limited to, volatile (e.g. random access memory (RAM)), non-volatile (e.g. read-only memory (ROM)), flash memory, or any combination. System memory 1704 may include an operating system 1705 and application 1707. Operating system 1705, for example, may be suitable for controlling the computing device 1700's operation and, in accordance with an embodiment, may comprise the WINDOWS operating systems from MICROSOFT CORPORATION of Redmond, Wash. The application 1707, for example, may comprise functionality for performing routines including, for example, managing ink content in structured formats, as described above with respect to the operations in routine 1600 of FIG. 16. It should be understood, however, that the embodiments described herein may also be practiced in conjunction with other operating systems and application programs and further, is not limited to any particular application or system.

The computing device 1700 may have additional features or functionality. For example, the computing device 1700 may also include additional data storage devices (removable and/or non-removable) such as, for example, magnetic disks, optical disks, solid state storage devices ("SSD"), flash memory or tape. Such additional storage is illustrated in FIG. 17 by a removable storage 1709 and a non-removable storage 1710. The computing device 1700 may also have input device(s) 1712 such as a keyboard, a mouse, a pen, a sound input device (e.g., a microphone), a touch input device for receiving gestures, an accelerometer or rotational sensor, etc. Output device(s) 1714 such as a display, speakers, a printer, etc. may also be included. The aforementioned devices are examples and others may be used. The computing device 1700 may include one or more communication connections 1716 allowing communications with other computing devices 1718. Examples of suitable communication connections 1716 include, but are not limited to, RF transmitter, receiver, and/or transceiver circuitry; universal serial bus (USB), parallel, and/or serial ports.

Furthermore, various embodiments may be practiced in an electrical circuit comprising discrete electronic elements, packaged or integrated electronic chips containing logic gates, a circuit utilizing a microprocessor, or on a single chip containing electronic elements or microprocessors. For example, various embodiments may be practiced via a system-on-a-chip ("SOC") where each or many of the components illustrated in FIG. 17 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein may operate via application-specific logic integrated with other components of the computing device/system 1700 on the single integrated circuit (chip). Embodiments may also be practiced using other technologies capable of performing logical operations such as, for example, AND, OR, and NOT, including but not limited to mechanical, optical, fluidic, and quantum technologies. In addition, embodiments may be practiced within a general purpose computer or in any other circuits or systems.

The term computer readable media as used herein may include computer storage media. Computer storage media may include volatile and nonvolatile, removable and non-removable media implemented in any method or technology for storage of information, such as computer readable instructions, data structures, or program modules. The system memory 1704, the removable storage device 1709, and the non-removable storage device 1710 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1700. Any such computer storage media may be part of the computing device 1700. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 18A and 18B illustrate a suitable mobile computing environment, for example, a mobile computing device 1850 which may include, without limitation, a smartphone, a tablet personal computer, a laptop computer, and the like, with which various embodiments may be practiced. With reference to FIG. 18A, an example mobile computing device 1850 for implementing the embodiments is illustrated. In a basic configuration, mobile computing device 1850 is a handheld computer having both input elements and output elements. Input elements may include touch screen display 1825 and input buttons 1810 that allow the user to enter information into mobile computing device 1850. Mobile computing device 1850 may also incorporate an optional side input element 1820 allowing further user input. Optional side input element 1820 may be a rotary switch, a button, or any other type of manual input element. In alternative embodiments, mobile computing device 1850 may incorporate more or less input elements. In yet another alternative embodiment, the mobile computing device is a portable telephone system, such as a cellular phone having display 1825 and input buttons 1810. Mobile computing device 1850 may also include an optional keypad 1805. Optional keypad 1805 may be a physical keypad or a "soft" keypad generated on the touch screen display.

Mobile computing device 1850 incorporates output elements, such as display 1825, which can display a graphical user interface (GUI). Other output elements include speaker 1830 and LED 1880. Additionally, mobile computing device 1850 may incorporate a vibration module (not shown), which causes mobile computing device 1850 to vibrate to notify the user of an event. In yet another embodiment, mobile computing device 1850 may incorporate a headphone jack (not shown) for providing another means of providing output signals.

Although described herein in combination with mobile computing device 1850, in alternative embodiments may be used in combination with any number of computer systems, such as in desktop environments, laptop or notebook computer systems, multiprocessor systems, micro-processor based or programmable consumer electronics, network PCs, mini computers, main frame computers and the like. Various embodiments may also be practiced in distributed computing environments where tasks are performed by remote processing devices that are linked through a communications network in a distributed computing environment; programs may be located in both local and remote memory storage devices. To summarize, any computer system having a plurality of environment sensors, a plurality of output elements to provide notifications to a user and a plurality of notification event types may incorporate the various embodiments described herein.

FIG. 18B is a block diagram illustrating components of a mobile computing device used in one embodiment, such as the mobile computing device 1850 shown in FIG. 18A. That is, mobile computing device 1850 can incorporate a system 1802 to implement some embodiments. For example, system 1802 can be used in implementing a "smartphone" that can run one or more applications similar to those of a desktop or notebook computer. In some embodiments, the system 1802 is integrated as a computing device, such as an integrated personal digital assistant (PDA) and wireless phone.

Applications 1867 may be loaded into memory 1862 and run on or in association with an operating system 1864. The system 1802 also includes non-volatile storage 1868 within memory the 1862. Non-volatile storage 1868 may be used to store persistent information that should not be lost if system 1802 is powered down. The applications 1867 may use and store information in the non-volatile storage 1868. The applications 1867 may also include functionality for performing routines including, for example, managing ink content in structured formats on a computing device, as described above with respect to the operations in routine 1600 of FIG. 16. A synchronization application (not shown) also resides on system 1802 and is programmed to interact with a corresponding synchronization application resident on a host computer to keep the information stored in the non-volatile storage 1868 synchronized with corresponding information stored at the host computer. As should be appreciated, other applications may also be loaded into the memory 1862 and run on the mobile computing device 1850.

The system 1802 has a power supply 1870, which may be implemented as one or more batteries. The power supply 1870 might further include an external power source, such as an AC adapter or a powered docking cradle that supplements or recharges the batteries.

The system 1802 may also include a radio 1872 (i.e., radio interface layer) that performs the function of transmitting and receiving radio frequency communications. The radio 1872 facilitates wireless connectivity between the system 1802 and the "outside world," via a communications carrier or service provider. Transmissions to and from the radio 1872 are conducted under control of OS 1864. In other words, communications received by the radio 1872 may be disseminated to the applications 1867 via OS 1864, and vice versa.

The radio 1872 allows the system 1802 to communicate with other computing devices, such as over a network. The radio 1872 is one example of communication media. The embodiment of the system 1802 is shown with two types of notification output devices: the LED 1880 that can be used to provide visual notifications and an audio interface 1874 that can be used with speaker 1830 to provide audio notifications. These devices may be directly coupled to the power supply 1870 so that when activated, they remain on for a duration dictated by the notification mechanism even though processor 1860 and other components might shut down for conserving battery power. The LED 1880 may be programmed to remain on indefinitely until the user takes action to indicate the powered-on status of the device. The audio interface 1874 is used to provide audible signals to and receive audible signals from the user. For example, in addition to being coupled to speaker 1830, the audio interface 1874 may also be coupled to a microphone (not shown) to receive audible (e.g., voice) input, such as to facilitate a telephone conversation. In accordance with embodiments, the microphone may also serve as an audio sensor to facilitate control of notifications. The system 1802 may further include a video interface 1876 that enables an operation of on-board camera 1840 to record still images, video streams, and the like.

A mobile computing device implementing the system 1802 may have additional features or functionality. For example, the device may also include additional data storage devices (removable and/or non-removable) such as, magnetic disks, optical disks, or tape. Such additional storage is illustrated in FIG. 18B by storage 1868.

Data/information generated or captured by the mobile computing device 1850 and stored via the system 1802 may be stored locally on the mobile computing device 1850, as described above, or the data may be stored on any number of storage media that may be accessed by the device via the radio 1872 or via a wired connection between the mobile computing device 1850 and a separate computing device associated with the mobile computing device 1850, for example, a server computer in a distributed computing network such as the Internet. As should be appreciated such data/information may be accessed via the mobile computing device 1850 via the radio 1872 or via a distributed computing network. Similarly, such data/information may be readily transferred between computing devices for storage and use according to well-known data/information transfer and storage means, including electronic mail and collaborative data/information sharing systems.

FIG. 19 is a simplified block diagram of a distributed computing system in which various embodiments may be practiced. The distributed computing system may include number of client devices such as a computing device 1903, a tablet computing device 1905 and a mobile computing device 1910. The client devices 1903, 1905 and 1910 may be in communication with a distributed computing network 1915 (e.g., the Internet). A server 1920 is in communication with the client devices 1903, 1905 and 1910 over the network 1915. The server 1920 may store application 1900 which may be perform routines including, for example, managing ink content in structured formats on a computing device, as described above with respect to the operations in routine 1600 of FIG. 16. Content developed, interacted with, or edited in association with the application 1900 may be stored in different communication channels or other storage types. For example, various documents may be stored using a directory service 1922, a web portal 1924, a mailbox service 1926, an instant messaging store 1928, or a social networking site 1930.

The application 1900 may use any of these types of systems or the like for enabling data utilization, as described herein. The server 1920 may provide the application 1900 to clients. As one example, the server 1920 may be a web server providing the application 1900 over the web. The server 1920 may provide the application 1900 over the web to clients through the network 1915. By way of example, the computing device 10 may be implemented as the computing device 1903 and embodied in a personal computer, a the tablet computing device 1905 and/or the mobile computing device 1910 (e.g., a smart phone). Any of these embodiments of the computing devices 1903, 1905 and 1910 may obtain content from the store 1916.

Various embodiments are described above with reference to block diagrams and/or operational illustrations of methods, systems, and computer program products. The functions/acts noted in the blocks may occur out of the order as shown in any flow diagram. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

What is claimed is:

1. A method of managing virtual ink in structured formats, comprising:
    recognizing a plurality of content types of virtual ink, wherein the plurality of content types comprises text, a table, a list, and a shape;
    receiving, by a computing device, virtual ink;
    determining, by a computing device, a content type of the virtual ink, wherein the content type is one of the plurality of content types;
    based on the determined content type, recognizing, by the computing device, that the virtual ink can be associated with a content format for an application;
    in response to recognizing that the virtual ink can be associated with the content format for the application, automatically generating a suggestion prompt, by the computing device, that provides an option to convert the virtual ink into the associated content format for the application; and
    converting, by the computing device, the at least one of the plurality of inputs of the virtual ink into the associated content format for the application when the option to convert is selected.

2. The method of claim 1, further comprising exporting the converted virtual ink into the associated application.

3. The method of claim 1, wherein the suggestion prompt is generated in response to a determination that the virtual ink is located a distance away from a second occurrence of virtual ink.

4. The method of claim 1, wherein the content format comprises a drawing object that is associated with a drawing software program.

5. The method of claim 1, further comprising:
    receiving the virtual ink in an ink application; and
    recognizing that the virtual ink can be associated with a spreadsheet application.

6. The method of claim 5, further comprising:
    recognizing that the table can be associated with the ink content format for a presentation application.

7. The method of claim 5, further comprising:
    receiving a gesture in a cell of the table in the ink application;
    recognizing that the gesture corresponds to a predetermined formula; and
    performing an operation based on the predetermined formula in the cell of the table in the ink application.

8. The method of claim 7, wherein the ink gesture is a swipe and the predetermined formula is a sum operation.

9. A computing device comprising:
    a memory for storing executable program code; and
    a processor, functionally coupled to the memory, the processor being responsive to computer-executable instructions contained in the program code and operative to:
        recognize a plurality of content types of virtual ink, wherein the plurality of content types comprises text, a table, a list, and a shape;
        receive a virtual ink input;
        determine a content type of the virtual ink input;
        recognize that the determined content type of the virtual ink input can be associated with an ink content format for a particular application;
        in response to recognizing that the determined content type can be associated with the content format for the particular application, automatically generate a suggestion prompt that provides an option to convert the virtual ink input into the content format for the particular application;
        convert the virtual ink input into the content format for the particular application when a user selects the option to convert; and
        display the converted virtual ink.

10. The computing device of claim 9, further comprising computer-executable instructions contained in the program code and operative to stop recognition of a second virtual ink input when a user ignores the suggestion prompt.

11. The computing device of claim 9, further comprising computer-executable instructions contained in the program code and operative to generate the suggestion prompt in response to a determination that the virtual ink input is located a distance away from a second virtual ink input.

12. The computing device of claim 9, further comprising computer-executable instructions contained in the program code and operative to:
   determine that the content type of the virtual ink input comprises one or more shapes; and
   recognize that the one or more shapes can be associated with the ink content format for a drawing application.

13. The computing device of claim 9, further comprising computer-executable instructions contained in the program code and operative to:
   receive the virtual ink input in an ink application;
   determine that the content type of the virtual ink input comprises a table; and
   recognize that the table can be associated with the ink content format for a spreadsheet application.

14. The computing device of claim 13 further comprising computer-executable instructions contained in the program code and operative to:
   receive a gesture in a cell of the table in the ink application;
   recognize that the gesture corresponds to a predetermined formula; and
   perform an operation based on the predetermined formula in the cell of the table in the ink application.

15. The computing device of claim 14, wherein the ink gesture is a swipe and the predetermined formula is a sum operation.

16. The computing device of claim 13 further comprising computer-executable instructions contained in the program code and operative to:
   recognize that the content type of the virtual ink input can be associated with a content format for two particular applications.

17. The computing device of claim 9, further comprising computer-executable instructions contained in the program code and operative to:
   determine that the content type of the virtual ink input comprises a list; and
   recognize that the one or more shapes can be associated with the ink content format for a word processing application.

18. The computing device of claim 9, further comprising computer-executable instructions contained in the program code and is operative to convert the virtual ink input into one or more of a word processing format, a spreadsheet format, and a drawing format.

19. A computer storage medium storing computer executable instructions which, when executed on a computing device, will cause the computing device to perform a method of managing virtual ink in structured formats, the method comprising:
   recognizing a plurality of structured formats of virtual ink, wherein the plurality of structured formats comprise text, a table, a list, and a shape;
   determining a structured format for an occurrence of virtual ink;
   recognizing, by the computing device, that the structured format of the occurrence of virtual can be associated with a content format for an application;
   automatically generating a suggestion prompt, by the computing device, that provides an option to convert the occurrence of virtual ink into the content format for the application;
   converting, by the computing device, the occurrence of virtual ink into the content format for the application when a user selects the option to convert;
   displaying the converted virtual ink; and
   exporting the converted virtual ink into the application.

20. The computer storage medium of claim 19, wherein the prompt is generated in response to a determination that the occurrence of virtual ink is located a distance away from a second occurrence of virtual ink.

* * * * *